(12) United States Patent
Sivertsen (10) Patent No.: US 8,161,203 B1
(45) Date of Patent: *Apr. 17, 2012

(54) DETECTING THE PRESENCE AND ACTIVITY OF A MASS STORAGE DEVICE

(75) Inventor: Clas Gerhard Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/715,099

(22) Filed: Mar. 1, 2010

Related U.S. Application Data (63) Continuation of application No. 11/837,256, filed on Aug. 10, 2007, now Pat. No. 7,685,329.

(51) Int. Cl.
G06F 3/00 (2006.01)
(52) U.S. Cl. .......................................................... 710/15
(58) Field of Classification Search ...................... 710/15
See application file for complete search history.

(56) References Cited

U.S. PATENT DOCUMENTS

| | | | |
|---|---|---|---|
| 5,835,700 | A | 11/1998 | Carbonneau |
| 6,078,979 | A | 6/2000 | Li et al. |
| 6,145,020 | A | 11/2000 | Barnett |
| 6,374,317 | B1 | 4/2002 | Ajanovic et al. |
| 6,957,291 | B2 | 10/2005 | Moon et al. |
| 6,993,772 | B2 | 1/2006 | Pike et al. |
| 7,110,928 | B1 | 9/2006 | Lee |
| 7,383,371 | B2 | 6/2008 | Kasahara |
| 7,597,582 | B2 * | 10/2009 | Nehling et al. ............... 439/490 |
| 2004/0193973 | A1 | 9/2004 | Porat et al. |
| 2005/0138154 | A1 | 6/2005 | Seto |
| 2005/0182881 | A1 | 8/2005 | Chou et al. |
| 2006/0149881 | A1 | 7/2006 | Clayton et al. |
| 2006/0194460 | A1 | 8/2006 | Chen et al. |
| 2006/0212760 | A1 | 9/2006 | Swoboda |
| 2007/0079032 | A1 | 4/2007 | Bissessur et al. |
| 2007/0260763 | A1 * | 11/2007 | Kasama ............................ 710/8 |
| 2008/0195786 | A1 * | 8/2008 | Lee ................................ 710/302 |

OTHER PUBLICATIONS

"SFF-8485 Specification for Serial GPIO Bus," Feb. 3, 2005, Revision 0.5, SFF Committee, 41 pages.
U.S. Appl. No. 11/211,271, filed Aug. 25, 2005 entitled "Method and Integrated Circuit for Providing Enclosure Management Services Utilizing Multiple Interfaces and Protocols", Inventor: Clas Gerhard Sivertsen.
U.S. Official Action dated May 29, 2009 in U.S. Appl. No. 11/211,271.

(Continued)

*Primary Examiner* — Chun-Kuan Lee
(74) *Attorney, Agent, or Firm* — Morris Manning & Martin LLP; Tim Tingkang Xia, Esq.

(57) ABSTRACT

Technologies are described herein for detecting the presence and activity of a mass storage device. A resistor divider circuit generates a voltage indicating whether a mass storage device has been mated to a mass storage backplane and whether the device is active. The circuit provides a voltage within a first range when the device is not mated to the storage backplane, and provides a voltage within a second range when the device is mated to the storage backplane but is inactive. The circuit also provides a voltage within a third range when the device is mated to the storage backplane and is active. The circuit can be connected to an integrated circuit that can determine, based on the output of the resistor divider circuit, whether the device has been mated to the storage backplane and whether the device is active.

11 Claims, 6 Drawing Sheets

OTHER PUBLICATIONS

U.S. Appl. No. 11/837,287, filed Aug. 10, 2007, entitled "Combining Multiple SGPIO Streams to Provide Device Status Indicators," Inventor: Clas Gerhard Sivertsen.

U.S. Official Action dated May 26, 2009 in U.S. Appl. No. 11/837,287.

U.S. Appl. No. 12/363,077, filed Jan. 30, 2009, entitled "Multiple Frequency State Detection for Serial I/O Interfaces," Inventor: Kayalvizhi Dhandapani.

U.S. Notice of Allowance/Allowability dated Oct. 20, 2009 in U.S. Appl. No. 11/837,256.

U.S. Notice of Allowance / Allowability dated Dec. 8, 2009 in U.S. Appl. No. 11/211,271.

U.S. Supplemental Notice of Allowability dated Feb. 5, 2010 in U.S. Appl. No. 11/837,256.

U.S. Official Action dated Mar. 5, 2010 in U.S. Appl. No. 11/837,287.

* cited by examiner

Fig. 6

DETECTING THE PRESENCE AND ACTIVITY OF A MASS STORAGE DEVICE

CROSS-REFERENCE TO RELATED APPLICATIONS

This patent application is a continuation of U.S. patent application Ser. No. 11/837,256, entitled "Detecting the Presence and Activity of a Mass Storage Device," filed Aug. 10, 2007, now U.S. Pat. No. 7,685,329 which is expressly incorporated herein by reference in its entirety.

BACKGROUND

In large scale computing systems, it is often necessary to provide an operator with detailed information regarding the presence and status of mass storage devices. In order to provide such functionality, many storage solutions utilize a storage backplane that interfaces with a host bus adapter ("HBA") and that directly mates with one or more mass storage devices. A storage backplane may include an integrated enclosure management device, which provides facilities for generating visual indicators regarding the status of connected mass storage devices. For instance, in some solutions, individual light-emitting diodes ("LEDs") may be driven by an enclosure management device on a storage backplane for displaying information regarding the activity, failure, rebuild status, and other information for each of the mass storage devices connected to the storage backplane.

Storage backplanes that are compatible with Serial Attached SCSI ("SAS") or Serial Advanced Technology Attachment ("SATA") mass storage devices utilize SAS internal connectors. The SAS internal connectors consist of a receptacle connector, which is utilized on each slot of the storage backplane, and a compatible drive-side plug connector, which is utilized on compatible mass storage devices. The drive-side plug connector is utilized on all SAS and SATA mass storage devices.

The SAS internal connectors define a pin (the READY LED pin) for conveying drive ready status. This pin is defined as a vendor-specific pin and, therefore, manufacturers are not required to implement the pin. Most mass storage manufacturers, however, utilize this pin to indicate drive activity for SATA devices. But, this pin cannot be utilized to directly drive an LED. In order to utilize this pin to drive an LED, a physically large and complex open collector or open drain transmitter circuit must be utilized. These types of circuits can occupy significant valuable board space on a storage backplane.

The SAS internal connectors also do not define a pin dedicated to conveying information regarding the detected presence or absence of a mass storage device. As a result, it can be difficult for a storage backplane to determine when a mass storage device has been connected, or "mated." It can be similarly difficult for a mass storage device to determine when a mass storage device has been disconnected, or "unmated."

It is with respect to these considerations and others that the disclosure presented herein is made.

SUMMARY

Technologies are described herein for detecting the presence of and activity of a mass storage device. In particular, through the use of the concepts and technologies presented herein, the mated or unmated status of a mass storage device can be determined using the SAS internal connectors, even though these connectors do not define a pin dedicated to conveying information regarding the presence or absence of a mass storage device. Moreover, the activity of a connected mass storage device can be detected and conveyed to an enclosure management integrated circuit along with the presence information utilizing only a single pin per mass storage device.

According to one aspect presented herein, a resistor divider circuit is disclosed that is operative to generate a voltage indicating whether a mass storage device has been mated to a mass storage backplane and whether the mass storage device is active. In one implementation the resistor divider circuit includes a first resistor divider configured to provide a voltage within a first voltage range when a mass storage device is not mated to the storage backplane, and to provide a voltage within a second voltage range when the mass storage device is mated to the storage backplane but is inactive. In order to provide such a voltage, the first resistor divider is connected to a pin of a mass storage device receptacle connector, such as a SAS receptacle connector, reserved for connection to a ground signal.

According to other aspects, the resistor divider circuit further includes a second resistor divider connected to the first resistor divider. The second resistor divider is configured to provide a voltage within a third voltage range when the mass storage device is mated to the storage backplane and is active. In order to provide such a voltage, the second resistor divider is connected to a pin of a mass storage device receptacle connector, such as a SAS receptacle connector, reserved for providing a drive ready signal (the READY LED pin of the SAS receptacle connector in one implementation).

In order to prove data regarding the presence and activity of mass storage devices, the resistor divider circuit may be connected to an enclosure management integrated circuit. The enclosure management integrated circuit includes an analog-to-digital converter ("ADC"), comparators, or other means for reading the voltage produced by the resistor divider circuit. The integrated circuit can then determine, based on the read voltage, whether a mass storage device has been mated to the storage backplane and whether the mass storage device is active. The integrated circuit may provide the presence information to an HBA. The activity information may be utilized by the integrated circuit to directly drive an LED indicating drive activity.

The above-described aspects may also be implemented as a computer-controlled apparatus, a computer process, a computing system, an apparatus, as an article of manufacture such as a computer program product or computer-readable medium, or as a semiconductor integrated circuit, including but not limited to a custom application specific integrated circuit, a programmable micro-controller type device, or a field-programmable gate array device. The computer program product may be a computer storage media readable by a computer system and encoding a computer program of instructions for executing a computer process.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

These and various other features as well as advantages, which characterize the technologies presented herein, will be

DETAILED DESCRIPTION

Technologies are presented herein for detecting the mated status and activity of a mass storage device. In the following detailed description, references are made to the accompanying drawings that form a part hereof, and in which are shown by way of illustration specific embodiments or examples. Referring now to the drawings, in which like numerals represent like elements through the several figures, aspects of the technologies presented herein and an exemplary operating environment will be described.

Figure 1:
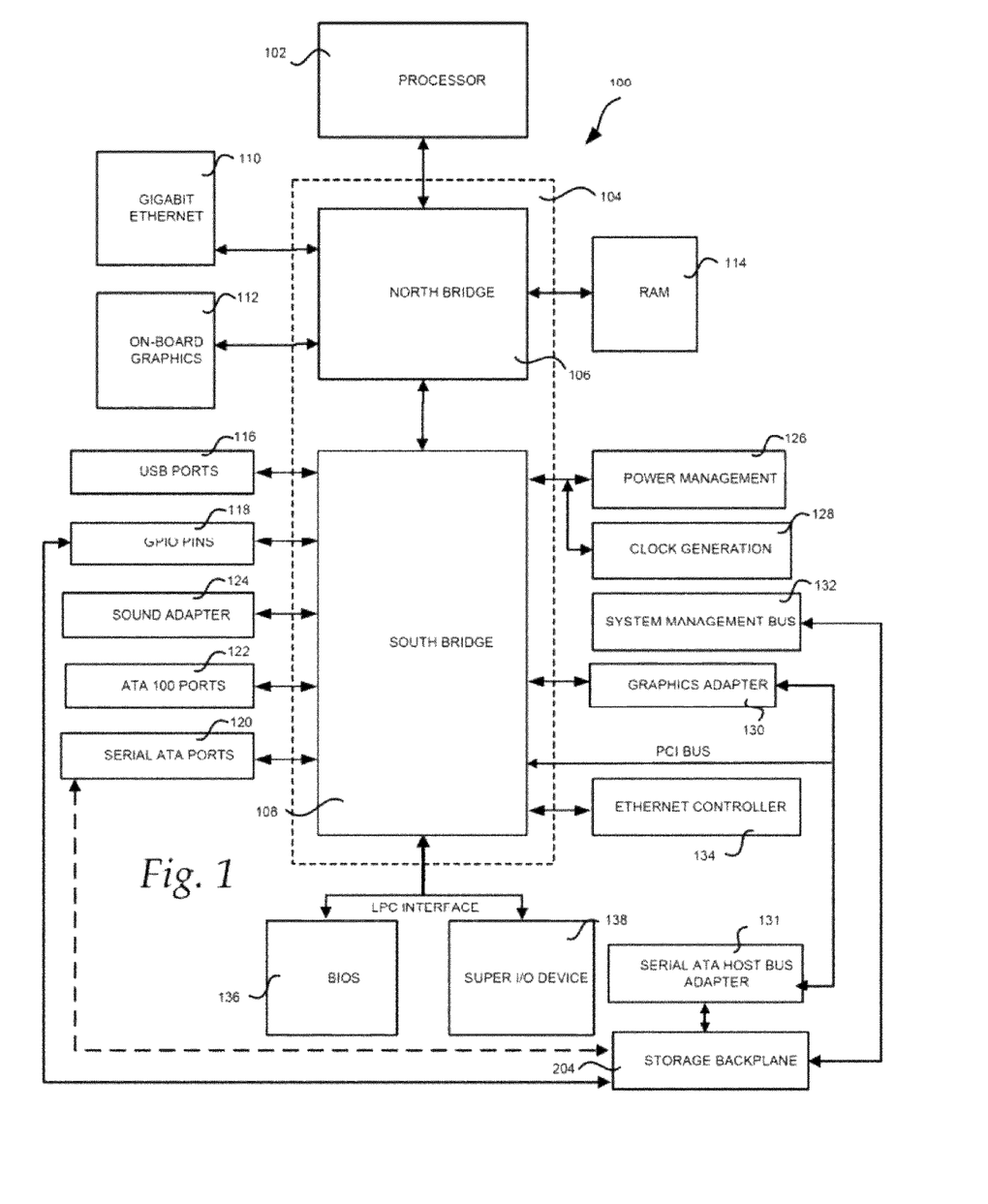
FIG. 1 is a computer architecture diagram showing aspects of a computer utilized as an illustrative operating environment for the various embodiments presented herein.

FIG. 1 and the following discussion are intended to provide a brief, general description of a suitable computing environment in which the concepts presented herein may be implemented. Generally, program modules include routines, programs, components, data structures, and other types of structures that perform particular tasks or implement particular abstract data types. Moreover, those skilled in the art will appreciate that the concepts presented herein may be practiced with other computer system configurations, including hand-held devices, multiprocessor systems, microprocessor-based or programmable consumer electronics, minicomputers, mainframe computers, and the like.

Referring now to FIG. 1, details regarding an illustrative operating environment for the embodiments presented herein will be provided. In particular, FIG. 1 illustrates a computer architecture that may be utilized in conjunction with the embodiments presented herein. It should be appreciated, however, that although the embodiments described herein are discussed in the context of a conventional server computer, the concepts presented herein might be utilized with virtually any type of computing device. FIG. 1 illustrates a host computer that, as will be described in greater detail below, may utilize one or more enclosure management backplanes 204 (also referred to herein as "storage backplanes") to interface with one or more mass storage devices. The enclosure management backplanes 204 described herein are equipped with circuitry for detecting the presence and activity of mass storage devices. It should be appreciated that the architecture of the computer 100 is merely illustrative and that any type of computer capable of hosting a HBA and a backplane 204 with enclosure management functionality may be utilized.

In order to provide the functionality described herein, the computer 100 shown in FIG. 1 includes a baseboard, or "motherboard", which is a printed circuit board to which a multitude of components or devices may be connected by way of a system bus or other electrical communication path. In one illustrative embodiment, a processor ("processor" or "CPU") 102 operates in conjunction with a chipset 104. The CPU 102 is a standard central processor that performs arithmetic and logical operations necessary for the operation of the computer 100.

The chipset 104 includes a north bridge 106 and a south bridge 108. The north bridge 106 provides an interface between the CPU 102 and the remainder of the computer 100. The north bridge 106 also provides an interface to the random access memory ("RAM") 114 and, possibly, an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections which may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general-purpose input/output ("GPIO") pins 118. The south bridge 108 may also provide a system management bus 132 for use in managing the various components of the computer 100. Power management circuitry 126 and clock generation circuitry 128 may also be utilized during the operation of the south bridge 108. The south bridge 108 may also provide a bus for interfacing peripheral card devices such as a graphics adapter 130. In one embodiment, the bus comprises a peripheral component interconnect ("PCI") bus. The PCI bus may also be utilized to interface with one or more HBAs, such as the serial ATA HBA 131. As described in greater detail below, the HBA 131 may be connected to an enclosure management backplane 204 for providing enclosure management functionality.

According to embodiments, the south bridge 108 is an enhanced south bridge operative to provide a HBA for connecting mass storage devices to the computer 100 without the use of an add-in card such as the PCI HBA 131. For instance, according to an embodiment, the south bridge 108 includes an advanced technology attachment ("ATA") adapter for providing one or more SATA ports 120 and an ATA 100 adapter for providing one or more ATA 100 ports 122. The SATA ports 120 and the SATA 100 ports 122 may be, in turn, connected directly to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user. Alternatively, the serial ATA ports 120 may be connected to an enclosure management backplane 204 for providing enclosure management functionality as described herein.

The mass storage devices connected to the south bridge 108, and its associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any type of computer-readable media. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information.

The south bridge 108 may also provide a low pin count ("LPC") interface for connecting a "Super I/O" device 138. The Super I/O device 138 is responsible for providing a number of input/output ports, including a keyboard port, a mouse port, a serial interface, a parallel port, and other types of input/output ports. The LPC interface may also connect a read-only memory ("ROM") device for storing a basic input/output system ("BIOS") 136 or an extensible firmware interface ("EFI") compatible firmware that includes program code containing the basic routines that help to start up the computer 100 and to transfer information between elements within the computer 100. It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
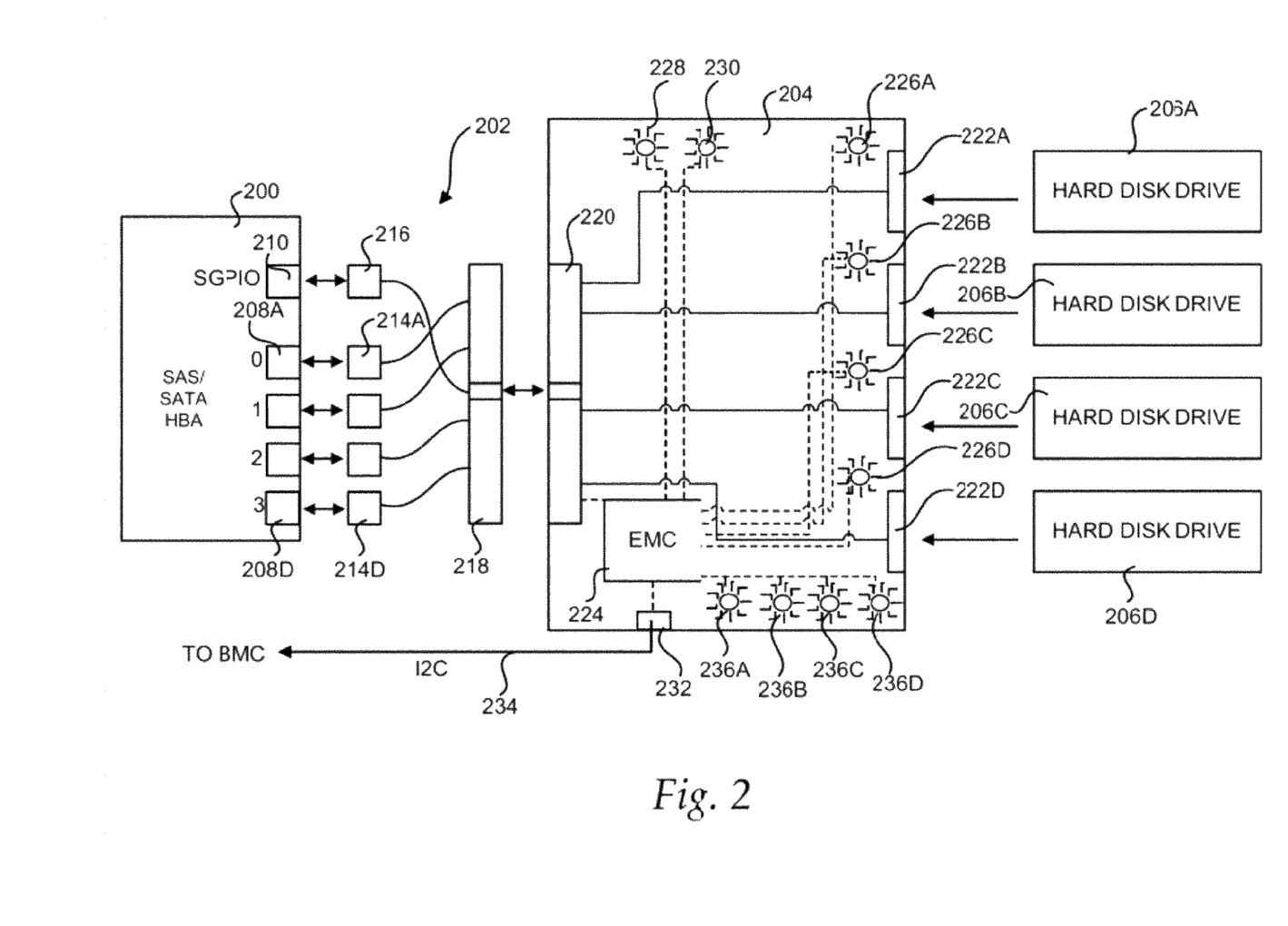
FIG. 2 is a block diagram illustrating aspects of a host bus adapter, enclosure management controller, and storage backplane provided in embodiments disclosed herein.

Turning now to FIG. 2, additional details regarding one operating environment for the embodiments presented herein and aspects of an enclosure management backplane 204 provided herein will be described. As shown in FIG. 2, an HBA 200 having one or more ports 208A-208D may be utilized in conjunction with a computing system, such as the computer 100 described above with respect to FIG. 1. According to embodiments, the HBA 200 comprises an HBA for use with SATA mass storage devices or an HBA compatible with SAS mass storage devices. It should be appreciated that other types of HBAs compatible with other types of mass storage devices may also be utilized.

According to embodiments, different physical interfaces may be utilized by the HBA 200 to exchange enclosure management data between the HBA 200 and the enclosure management backplane 204. For instance, some SAS-compatible HBAs are equipped with a serial general purpose input/output ("SGPIO") interface, while some SATA-compatible HBAs, on the other hand, utilize a control or management bus, such as the I2C bus from PHILIPS SEMICONDUCTORS, to exchange enclosure management data between the enclosure management backplane 204 and the HBA 200 or a baseboard management controller ("BMC"). In the case of an HBA 200 equipped with SGPIO, an SGPIO port 210 is included on the HBA 200 for making an appropriate connection with the backplane 204. According to embodiments, the port 210 can be utilized to carry a second I2C channel rather than SGPIO. This may be a user-defined feature.

When an I2C bus is utilized, an appropriate I2C port is made available on a BMC to communicate with the enclosure management backplane 204 via the port 232. In other implementations, typically where SATA mass storage devices are utilized, no physical interface for communicating management data between the HBA 200 and the backplane 204 may be utilized. In other embodiments, the system management bus ("SMBus") developed by INTEL CORPORATION may be utilized.

It should be appreciated that the particular physical interfaces described herein for exchanging enclosure management information with the backplane are merely illustrative and that any physical communications link suitable for transmitting enclosure management data may be utilized with the various embodiments presented herein. The HBA 200 may also support multiple enclosure management interfaces and protocols, such as I2C and SGPIO both, or some custom enclosure management bus. The HBA 200 may have a jumper or additional pins on the cable or connectors used to carry the enclosure management interface from the HBA 200 to the backplane 204. These additional pins may be used to communicate to the HBA 200 which interface should be used, in the case where there are multiple options. Additionally, the HBA 200 may use some form of automatic or default detection mechanism, where it would transmit data over the various available interfaces, and then either not receive a response on the interfaces where there is no available enclosure management device, or receive a response from a device that can acknowledge the response for the particular protocol that the HBA 200 sent out a query for. It is also possible that an HBA 200 can be configured to support a particular enclosure management protocol by upgrading the firmware of the HBA 200, or by using host-side applications, command line utilities, or configuration monitors i.e. over a direct serial port to the HBA 200. This same access and configuration method could be used to change or otherwise configure specific instructions and commands that are sent to the enclosure management backplane.

As shown in FIG. 2, an appropriate cable may be utilized to connect the ports 208A-208D of the HBA 200 to the enclosure management backplane 204. In particular, individual cables may be utilized to connect the ports 208A-208D to the backplane 204. Alternatively, a multilane cable 202 may be utilized to connect the individual ports on the HBA 200 to a single multilane connector 220 on the backplane 204. It should be appreciated that the multilane cable 202 may be equipped with multilane connectors on both ends or only on one end, as shown in FIG. 2. Where the multilane cable 202 includes only one multilane connector 218, the other end may be configured with individual connectors 214A-214D compatible with the ports 208A-208D on the HBA 200. It should also be appreciated that although the HBA 200 has been illustrated as having four ports 208A-208D, HBAs with other port configurations may be utilized. Alternatively, the backplane 204 may be configured for use with fewer or more drives. Other configurations should also be apparent.

When the HBA 200 comprises an SAS-compatible HBA and includes a SGPIO port 210, the multilane cable 202 may further include an appropriate connector 216 for connecting to the SGPIO port 210. The multilane connector 218 is also appropriately configured for passing the side-band signals from the SGPIO port 210 to an appropriate portion of the multilane connector 220 on the backplane 204. When I2C is utilized, an appropriate I2C cable 234 may be utilized for connecting to the I2C port 232 on the enclosure management backplane 204. As will be described in greater detail below, the SGPIO signals are routed from the multilane connector 220 to an enclosure management integrated circuit ("IC") 224 on the enclosure management backplane 204 and the I2C signals are routed from the I2C connector 232 to the enclosure management integrated circuit 224 on the enclosure management backplane 204. As will be described in detail below, the backplane 204 and the enclosure management controller IC 224 are configured in one embodiment to receive enclosure management information on multiple interfaces to thereby support the use of many types and configurations of HBAs.

As also shown in FIG. 2, the enclosure management backplane 204 includes connectors 222A-222D for directly interfacing with one or more mass storage devices, such as the hard disk drives 206A-206D. SAS receptacle connectors are utilized in one embodiment. According to embodiments, the backplane 204 may be mounted within an enclosure such that the hard disk drives 206A-206D slide into the slots in an enclosure and thereby mate directly with the appropriate connector 222A-222D. The backplane 204 also includes circuitry for routing signals to and from the connectors 222A-222D to the appropriate portions of the multilane connector 220. In this manner, the backplane 204 enables direct communication between then HBA 200 and the connected hard disk drives 206A-206D.

As discussed briefly above, the enclosure management backplane 204 provides a number of enclosure management functions. To enable this functionality, the enclosure management backplane 204 is equipped with an enclosure management IC 224.

The enclosure management IC 224 is operative to receive enclosure management data from the HBA 200 on one of any number of physical interfaces, such as I2C and SGPIO, and to perform various management functions in response to receiving this data. For instance, the enclosure management IC 224 may receive data from the HBA 200 instructing it to illuminate one of the LEDs 226A-226D for locating a particular one of the hard disk drives 206A-206D. The enclosure management IC 224 may also illuminate the LEDs 226A-226D to indicate activity on the hard disk drives 206A-206D in the manner described below. The LEDs 236A-236D may also be illuminated by the enclosure management IC 224 to indicate that one of the hard disk drives 206A-206D has failed. LEDs 228 and 230 may also be illuminated to provide a global indication that one of the hard disk drives 206A-206D, or a hard disk drive connected to another connected backplane, is active or has failed. The enclosure management IC 224 may also provide information to the HBA 200. For instance, data indicating whether a particular drive is mated to the backplane 204 may be provided by the enclosure management controller IC 224 to the HBA 200. Additional details regarding the configuration and operation of the enclosure management controller IC 224 are provided below with respect to FIG. 3.

Figure 3:
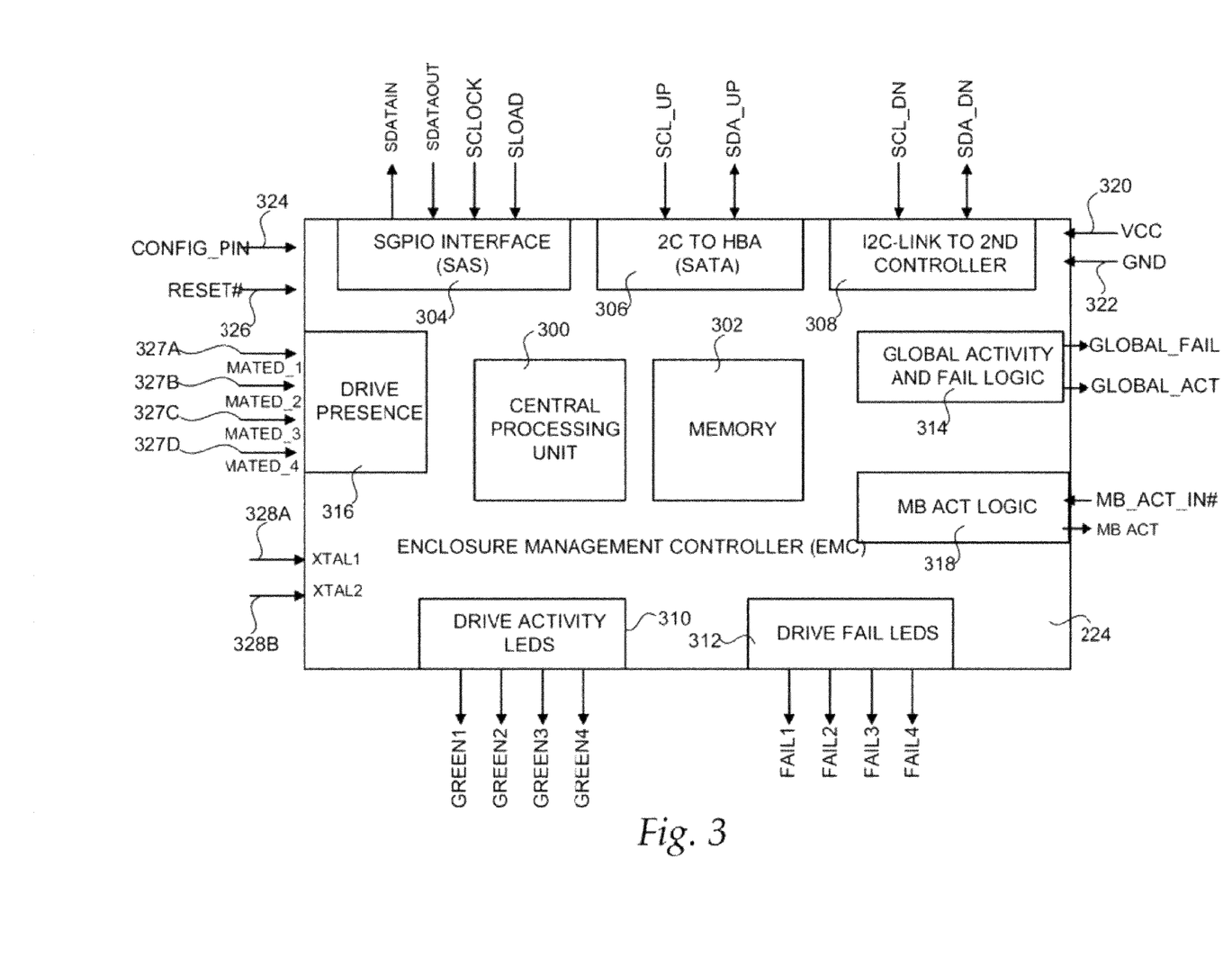
FIG. 3 is a functional block diagram illustrating aspects of an enclosure management controller integrated circuit provided in one embodiment presented herein.

Referring now to FIG. 3, a functional block diagram illustrating aspects of an enclosure management controller IC 224 provided herein will be described. As shown in FIG. 3, the enclosure management IC 224 includes a CPU 300 and memory 302 in one implementation. The CPU 300 controls the overall operation of the IC 224 as described herein. The memory 302 may be utilized by the CPU 300 during the performance of its processing functions. It should be appreciated that although the IC 224 is described herein as a programmable micro-controller including a CPU 300 and memory 302, the embodiments presented herein may also be implemented utilizing a general purpose computer, a custom application specific integrated circuit, a field-programmable gate array device, or any other type of IC or computing known to those skilled in the art.

According to embodiments, the enclosure management IC 224 shown in FIG. 3 is equipped with multiple physical interfaces for communicating enclosure management data with an HBA. For instance, the IC 224 may include an SGPIO interface 304 for communicating enclosure management data with a SAS-equipped HBA. The SGPIO interface 304 supports four signals: SDATAOUT, the serial data output bit stream from the initiator; SDATAIN, the serial output stream to the initiator; SCLOCK, the clock signal from the initiator; and SLOAD, the last clock of a bit stream from the initiator. The use of these signals is known to those skilled in the art.

According to embodiments, the enclosure management IC 224 is also equipped with an I2C interface 306 for communicating enclosure management data with a BMC or the system management bus 132. The interface 306 includes two signals: SCL_UP, the serial clock line for connection to the BMC, system management bus, or another upstream I2C device; and SDA_UP, the serial data line for connection to the BMC, system management bus, or another upstream I2C device. An interface 308 may also be provided for connecting to a downstream I2C device. The interface 308 includes two signals: SCL_DN, the serial clock line for connection to a downstream I2C device; and SDA_DN, the serial data line for connection to a downstream I2C device. It should be appreciated that, in one embodiment, the HBA 200 communicates with the IC 224 over a private I2C bus. In this case, the SCSI enclosure services ("SES") protocol is utilized. The I2C or SGPIO bus can be routed to the backplane 204 through the cable 202.

The enclosure management controller IC 224 may also include circuitry for generating output signals for driving a visual or audible indicator. For instance, an output portion 310 may be provided for driving LEDs when one or more of the connected hard disk drives are active. A mechanism for determining when connected mass storage devices are active is described below with reference to FIGS. 4-6. Similarly, an output portion 312 may be provided for driving LEDs when one or more of the connected hard disk drives has failed. It should be appreciated that a separate output is provided for driving an individual LED indicating the activity or failure of each hard disk drive. In other embodiments, the enclosure management controller IC 224 also includes circuitry 314 for driving an indicator showing global activity and global failure. It should be appreciated that these outputs may be configured to either drive an LED directly or to connect to an upstream IC 224. In this manner, the activity and failure of drives connected to one IC 224 may be communicated to additional upstream ICs 224.

The enclosure management controller IC 224 also includes an input 320 for receiving an appropriate voltage for powering the operation of the IC 224 (typically +5V DC), an input 322 for connecting to ground, inputs 328A-328B for receiving an appropriate clock signal, an input 324 for enabling a configuration of the IC 224, and a reset input 326 for resetting the operation of the IC 224. Additional details regarding the operation of the enclosure management controller IC 224 and associated circuitry are provided below with respect to FIGS. 4-6.

As shown in FIG. 3, the IC 224 also includes one or more pins 327A-327D connected to drive presence circuitry 316 capable of detecting the presence of a mass storage device. As will be discussed in detail below with respect to FIGS. 4-6, the drive presence circuitry 316 comprises an analog-to-digital converter ("ADC") in one embodiment that is configured to detect the voltage on the pins 327A-327D and, based on the detected voltage, to determine whether a mass storage device has been connected. In this embodiment, each of the pins 327A-327D is utilized to convey information regarding the mated status of a single mass storage device. According to embodiments, the drive presence circuitry 316 may also comprise one or more comparators configured to detect the voltage on the pins 327A-327D.

As will also be described in detail below with respect to FIGS. 4-6, the pins 327A-327D and the drive presence circuitry 316 may also be configured in one embodiment to detect the activity of a mass storage device. In this regard, the IC 224 is configured to determine, based on the voltage read at each of the pins 327A-327D, whether a mass storage device connected to each of the pins 327A-327D is active. In this manner, a single one of the pins 327A-327B of the IC 224 can be utilized to determine the mated status of a mass storage device and whether a connected mass storage device is active or inactive. The IC 224 may transmit data regarding the mated status of each mass storage device to an HBA via the SGPIO interface 304 or the I2C interface 306. The IC 224 may also utilize the detected activity information to directly drive the drive activity LEDs 310 corresponding to active mass storage devices. Additional details regarding this process are provided below with respect to FIGS. 4-6.

Figure 4:
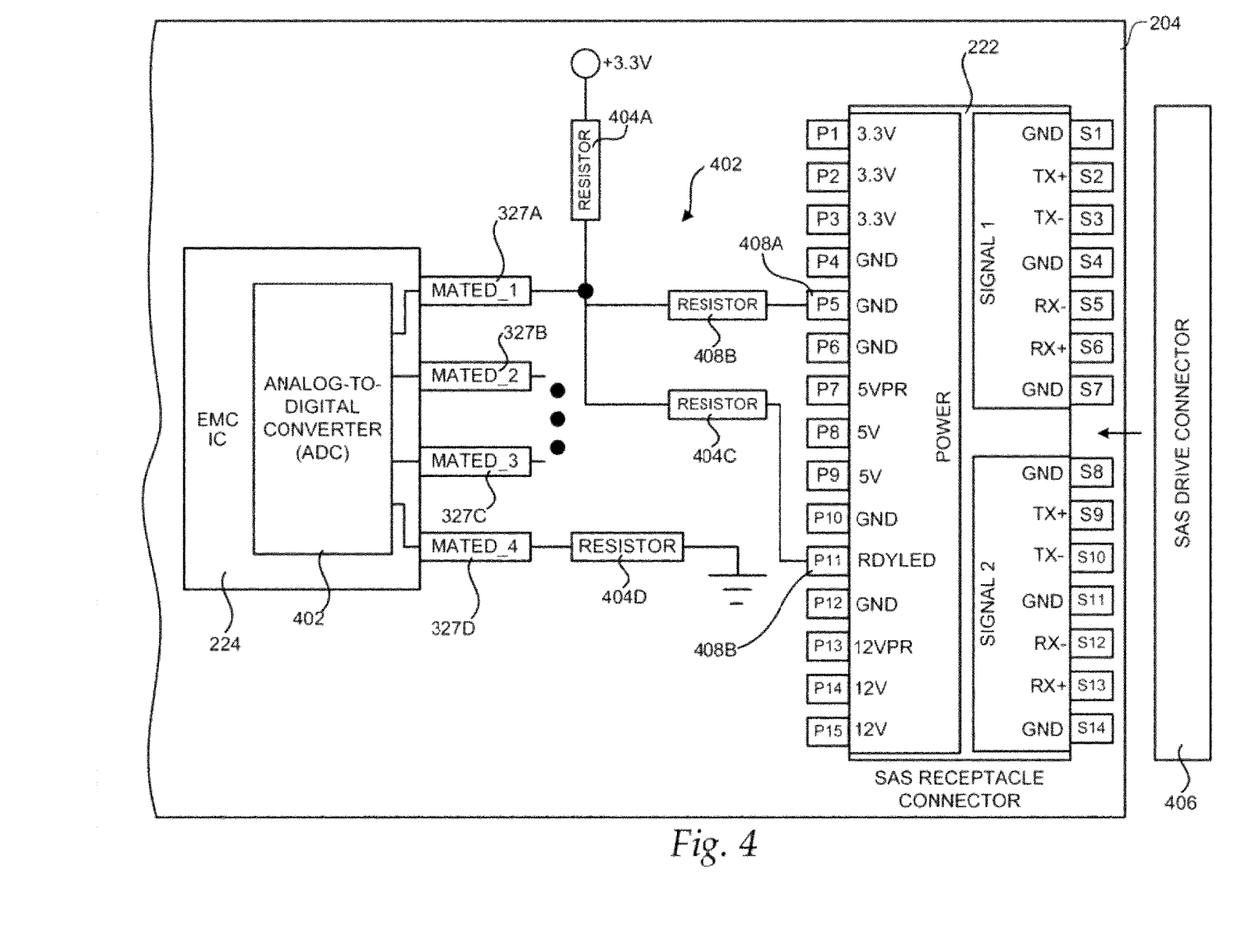
FIG. 4 is a circuit diagram illustrating aspects of a resistor divider circuit provided in one implementation presented herein for detecting the mated status and activity of a mass storage device.

Referring now to FIG. 4, a circuit diagram will be described that illustrates aspects of a resistor divider circuit 402 provided in one implementation presented herein for detecting the mated status and activity of a mass storage device. In the embodiment illustrated in FIG. 4, the enclosure management controller integrated circuit 224 is configured with an ADC 402 connected to one or more of the pins 327A-327D. As discussed briefly above, comparators may be utilized in various embodiments in place of the ADC 402.

In the implementation shown in FIG. 4, the resistor divider circuit 402 includes several resistor dividers. The first resistor divider includes a resistor 404A connected to the pin 327A and to power, in this case +3.3V DC. The first resistor divider also includes a resistor 404B connected to the pin 327A and to a pin 408A of the mass storage device receptacle connector 222 reserved for carrying a ground signal. Although reserved for carrying a ground signal, the pin 408A is not connected to ground. In an implementation, the receptacle connector 222 comprises a SAS receptacle connector and the resistor 404B is connected to the pin 408A (P5) of the SAS receptacle connector. It should be appreciated, however, that the resistor 404B may be connected to other pins reserved for carrying a ground signal on the receptacle connector 222.

As will be discussed in greater detail below with respect to FIG. 5, when no mass storage device is mated to the receptacle connector 222, the voltage present at the pin 327A will be in the range of 2.5 to 3.3V DC. When the drive connector 406 of a mass storage device is mated to the receptacle connector 222, however, the resistor 404B will cause the voltage present at the pin 327A to be divided in half, thereby producing a voltage in the range of 1.4V to 1.8V DC. This voltage is read by the ADC 402 to determine the mated status.

According to one embodiment, a second resistor divider is utilized to also convey drive activity information. The second resistor divider includes a resistor 404C connected to the pin 327A and to a pin 408B of the receptacle connector 222 reserved for providing a drive ready signal. According to one embodiment, the resistor 404C is connected to a pin 408B of a SAS receptacle connector reserved for providing a drive ready signal (the READY LED pin). As discussed briefly above, the READY LED pin 408B of the SAS receptacle connector 222 is utilized to convey drive activity information. In this regard, the pin 408B is pulled low when a connected mass storage device is active.

The second resistor divider causes the voltage present at the pin 327A to be halved again when a connected mass storage device is active. In particular, the voltage present at the pin 327A will be halved to a voltage range of 0.9V to 1.2V when a drive is mated and is active. The IC 224 reads this voltage using the ADC 402 and drives a drive activity LED 310 appropriately. It should be appreciated, therefore, that the resistor divider circuit 402 allows both the mated status of a mass storage device and the activity of the device to be provided to the IC 224 utilizing only a single pin of the IC 224 per device.

In one implementation, the resistors 404A-404C are 10K Ohm resistors. It should be appreciated, however, that other types of resistors might be utilized to provide the desired results. It should also be appreciated that more resistors may be utilized than shown in FIG. 4. It should further be appreciated that the voltages and voltage ranges described herein are merely illustrative and that other voltages and voltage ranges may also be utilized. It should also be appreciated that a separate resistor divider circuit 402 is connected to each of the pins 327A-327D and to separate receptacle connectors to provide the above-described functionality for multiple mass storage devices. If any of the pins 327A-327D are not utilized (i.e. there is no corresponding slot for receiving a mass storage device), the pins are pulled to ground, such as through the use of the resistor 404D. In this manner, 0V DC is present at the IC 224 for each of the pins 327A-327D that is not utilized.

Figure 5:
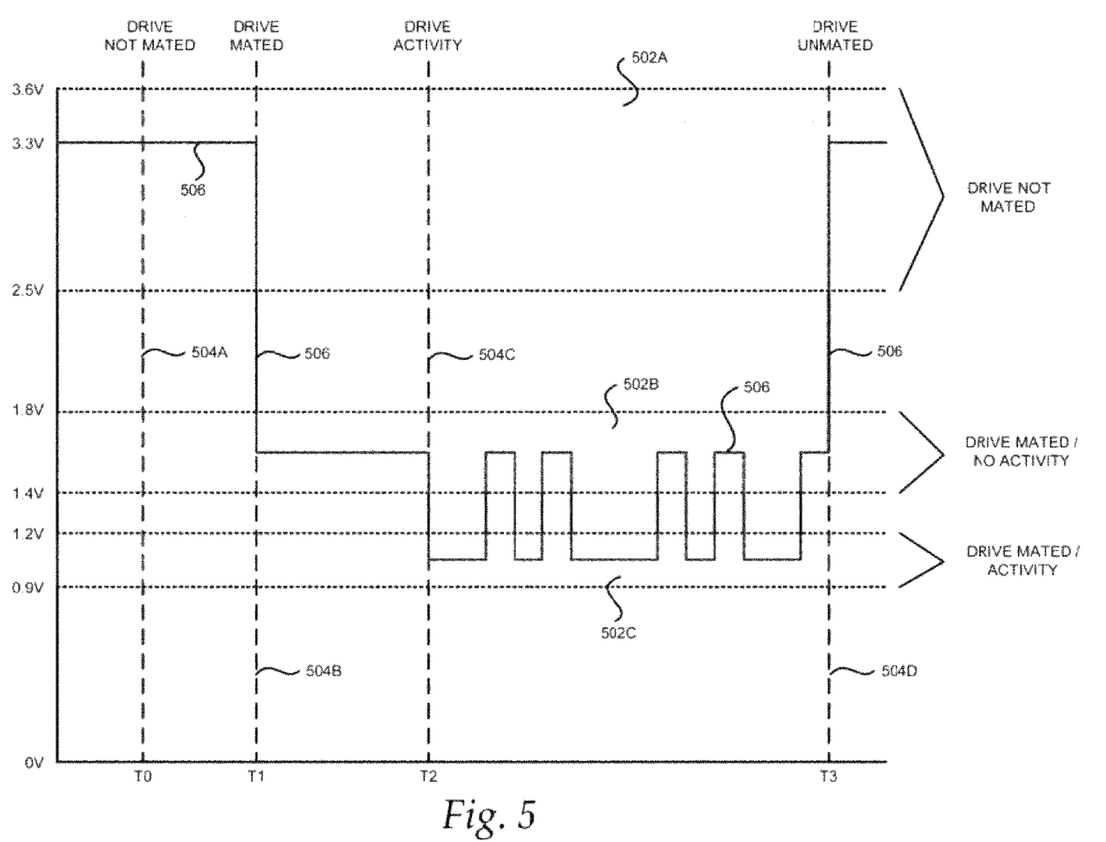
FIG. 5 is a timing diagram illustrating aspects of the output of a resistor divider circuit provided in one implementation for detecting the mated status and activity of a mass storage device.

Turning now to FIG. 5, a timing diagram will be described that illustrates aspects of the output of the resistor divider circuit 402 provided in one implementation for detecting the mated status and activity of a mass storage device. As shown in FIG. 5 and briefly described above, the output of the resistor divider circuit 402 in one implementation is in one of three voltage ranges 502A-502C. When a mass storage device is not mated, the output will be in the voltage range 502A, which is between 2.5V and 3.6V DC in one embodiment. When a mass storage device is mated but is inactive, the output will be in the voltage range 502B, which is between 1.4V and 1.8V DC in one embodiment. When a mass storage device is mated and is also active, the output will be in the voltage range 502C, which is between 0.9V and 1.2VDC in one embodiment.

FIG. 5 also shows a sample output 506 of the resistor divider circuit 402. At time T0 504A, no mass storage device has been mated to the storage backplane 204. Accordingly, the output 506 at time T0 504A is 3.3V DC, which is within the voltage range 502A. At time T1 504B, a mass storage device is mated to the storage backplane 204. Accordingly, the output 506 drops to 1.6V DC, which is within the voltage range 502B. At time T2 504C, the mass storage device becomes active and the output 506 drops to approximately 1.0V DC, which is within the voltage range 502B. Between time T2 504C and time T3 504D, the mass storage device has periods of activity and inactivity. Accordingly, the output 506 fluctuates during this period between the voltage range 502C and the voltage range 502B. At time T3 504D, the mass storage device is unmated and the output 506 again returns to within the voltage range 502A.

Figure 6:
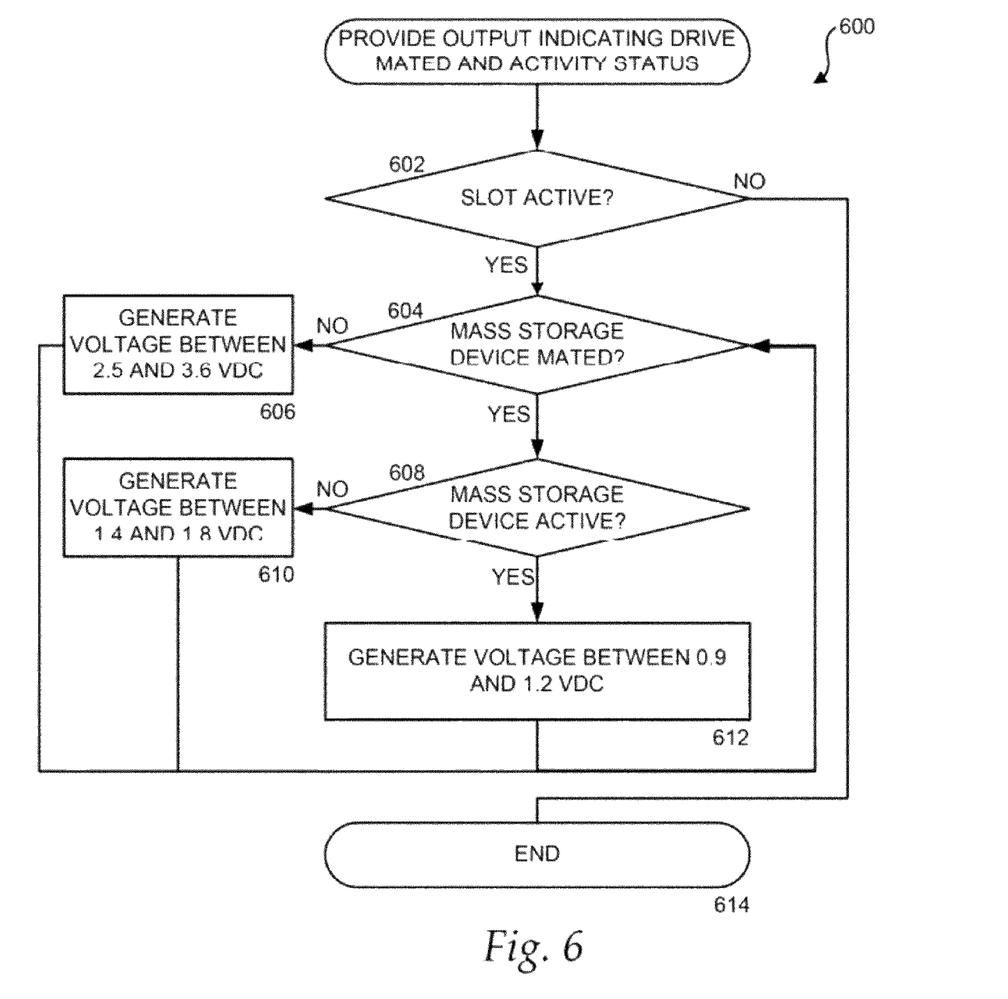
FIG. 6 is a flow diagram illustrating a method of operation provided herein for detecting the mated status and activity of a mass storage device in one embodiment.

Referring now to FIG. 6, a flow diagram will be described that illustrates a method of operation provided herein for detecting the mated status and activity of a mass storage device in one embodiment. It should be appreciated that the logical operations of the various embodiments presented herein are implemented (1) as a sequence of computer implemented acts or program modules running on a computing system and/or (2) as interconnected machine logic circuits or circuit modules within the computing system. The implementation is a matter of choice dependent on the performance requirements of the computing system or integrated circuit integrating the concepts presented herein. Accordingly, the logical operations described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 600 begins at operation 602, where a determination is made as to whether one of the pins 327A-327D under consideration is configured for use. As discussed above, any of the pins 327A-327D that will not be utilized are pulled to ground using a resistor 404D. As a result, 0V DC will be present on any of the pins 327A-327D that will not be utilized. If the current pin under consideration is not used, the routine 600 branches to operation 614, where it ends. If the pin 327 is enabled for use, such as through connection to the resistor divider circuit 402, the routine 600 continues to operation 604.

At operation 604, a determination is made as to whether a mass storage device has been mated. If so, the routine 600 branches to operation 606, where the resistor divider circuit 402 generates a voltage within the voltage range 502A (between 2.5 and 3.6V DC). From operation 606, the routine 600 returns to operation 604, described above. If, at operation 604, it is determined that a mass storage device has been mated, the routine 600 continues from operation 604 to operation 608.

At operation 608, a determination is made as to whether the mated mass storage device is active. If the mass storage device is not active, the routine 600 branches to operation 610, where a voltage within the voltage range 502B is generated (between 1.4V and 1.8V DC). If the mass storage device is active, the routine 600 proceeds to operation 612, where a voltage within the voltage range 502C is generated (between 0.9V and 1.2V DC). From operations 606, 610, and 612, the routine 600 returns to operation 604, described above.

It will be appreciated that technologies are presented herein for detecting the presence and activity of a mass storage device. Although the embodiments presented herein have been described in language specific to computer structural features, methodological acts and by computer readable media, and implementations utilizing a semiconductor integrated circuit, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A resistor divider circuit configured to indicate if a mass storage device is mated to a storage backplane and if the mass storage device is active, the circuit comprising:

a first resistor divider connected to a first pin of a mass storage device reserved for connection to a ground signal, the first resistor divider configured to provide a voltage within a first voltage range if the mass storage device is not mated to the storage backplane, and a voltage within a second voltage range if the mass storage device is mated to the storage backplane and is active; and a second resistor divider connected to a second pin of the mass storage device reserved for providing a drive ready signal, the second resistor divider configured to provide a voltage within a third voltage range when the mass storage device is mated to the storage backplane and the mass storage device is active, wherein the first resistor divider is connected to an input pin of an integrated circuit that is configured to read the first, second, and third voltages and, based on whether the voltage is within the first voltage range, the second voltage range, or the third voltage range, to determine if the mass storage device is mated to the storage backplane and if the mass storage device is active.

2. An apparatus configured to detect if a mass storage device is mated to a storage backplane and to provide an activity indicator for the mass storage device, the apparatus comprising:

a resistor divider circuit that is configured to output a first voltage in a first voltage range when the mass storage device is not mated to the storage backplane, a second voltage in a second voltage range when the mass storage device is mated to the storage backplane, and a third voltage in a third voltage range when the mass storage device is mated to the storage backplane and the mass storage device is active, wherein the first, second, and third ranges of voltages are different;

an integrated circuit comprising an input pin configured to receive the output of the resistor divider circuit, the integrated circuit configured to read the output of the resistor divider circuit and, based on whether the output is within the first voltage range, second voltage range, or third voltage range, to determine if the mass storage device is mated to the storage backplane and if the mass storage device is active, and to provide an activity indicator if the mass storage device is active;

a first resistor, within the resistor divider circuit, connected to an input of the integrated circuit and to a power signal;

a second resistor, within the resistor divider circuit, connected to the input of the integrated circuit and to a ground signal pin reserved for carrying a ground signal; and a third resistor, within the resistor divider circuit, connected to the input of the integrated circuit and to a drive ready signal pin reserved for carrying a drive signal.

3. The apparatus of claim 2, wherein the integrated circuit comprises an analog-to-digital converter for reading the output of the resistor divider circuit.

4. The apparatus of claim 2, wherein the ground signal pin is grounded when the mass storage device is connected, and wherein the drive ready signal pin is driven to a low state when the mass storage device is active.

5. The apparatus of claim 4, wherein the integrated circuit is further configured to provide a signal to a host bus adapter indicating if the mass storage device is mated to the storage backplane.

6. The apparatus of claim 5, further comprising a circuit that is arranged to provide a fourth voltage in a fourth voltage range to the integrated circuit if a slot of the storage backplane is not available to be utilized.

7. The apparatus of claim 6, wherein the first voltage range comprises a range of voltages substantially between 2.5 and 3.6 volts direct current (DC), wherein the second voltage range comprises a range of voltages substantially between 1.4 and 1.8 volts DC, wherein the third voltage range comprises a range of voltages substantially between 0.9 and 1.2 volts DC, and wherein the fourth voltage range is substantially zero.

8. The apparatus of claim 2, wherein the integrated circuit comprises one or more comparators for reading the output of the resistor divider circuit.

9. A method for generating an output signal indicating if a mass storage device is mated to a storage backplane and if the mass storage device is active, the method comprising:
- connecting a first resistor to an input of an integrated circuit and to a power signal;
- connecting a second resistor to the input of the integrated circuit and to a ground signal pin reserved for carrying a ground signal;
- connecting a third resistor to the input of the integrated circuit and to a drive ready signal pin reserved for carrying a drive ready signal;
- generating a signal within a first range of voltages if a mass storage device is not mated to the storage backplane;
- generating a signal within a second range of voltages if the mass storage device is mated to the storage backplane and the mass storage device is inactive;
- generating a signal within a third range of voltages if the mass storage device is mated to the storage backplane and the mass storage device is active, wherein the first, second, and third ranges of voltages are different;
- reading the signal on the input pin of the integrated circuit, wherein the integrated circuit is configured to, based on whether the signal read on the input pin is within the first range of voltages, second range of voltages, or third range of voltages, determine if the mass storage device is mated to the storage backplane and if the mass storage device is active; and
- generating, based on the signal, an output comprising an activity indicator if the mass storage device is active.

10. The method of claim 9, wherein generating an output based on the signal comprises providing an indication to a host bus adapter when the mass storage device is mated to the storage backplane.

11. The method of claim 10, further comprising generating a signal within a fourth range of voltages when the mass storage device is not available to be connected to a corresponding slot of the storage backplane.

* * * * *